United States Patent [19]

Paul et al.

[11] Patent Number: 4,600,632

[45] Date of Patent: Jul. 15, 1986

[54] UV-STABILIZED POLYCARBONATE MOULDINGS

[75] Inventors: Winfried Paul, Krefeld; Hartmut Löwer, Hilden; Peter R. Müller, Leverkusen, all of Fed. Rep. of Germany; Mark W. Witman, Pittsburgh, Pa.; Siegfried Storp, Cologne, Fed. Rep. of Germany

[73] Assignee: Bayer Aktiengesellschaft, Leverkusen, Fed. Rep. of Germany

[21] Appl. No.: 722,581

[22] Filed: Apr. 12, 1985

[30] Foreign Application Priority Data

Apr. 14, 1984 [DE] Fed. Rep. of Germany ....... 3414116

[51] Int. Cl.$^4$ .................................................. B05D 7/00
[52] U.S. Cl. ...................................... 428/220; 428/336; 524/91; 524/94; 525/464; 525/474
[58] Field of Search ............... 524/91, 94; 525/464, 525/474; 428/220, 336

[56] References Cited

U.S. PATENT DOCUMENTS

| | | | |
|---|---|---|---|
| Re. 27,682 | 6/1973 | Schnell et al. | 260/47 XA |
| 3,028,365 | 4/1962 | Schnell et al. | 260/47 |
| 3,043,709 | 7/1962 | Amborski | 117/7 |
| 3,049,443 | 8/1962 | Coleman | 117/138.8 |
| 3,189,662 | 6/1965 | Vaughn, Jr. | 528/10 |
| 3,309,219 | 3/1967 | Etherington | 427/443 |
| 3,309,220 | 3/1967 | Osteen | 427/401 |
| 3,367,958 | 2/1968 | Kirkendall | 260/45.8 |
| 3,375,298 | 3/1968 | Fox | 260/830 |
| 3,419,634 | 12/1968 | Vaughn, Jr. | 528/14 |
| 3,544,514 | 12/1970 | Schnell et al. | 260/47 |
| 3,582,398 | 6/1971 | Ringler | 117/33.3 |
| 3,617,330 | 11/1971 | Peilstocker | 524/91 |
| 3,679,774 | 7/1972 | Le Grand | 525/474 |
| 3,821,325 | 6/1974 | Merritt, Jr. | 528/10 |
| 3,832,419 | 8/1974 | Merritt, Jr. | 528/10 |
| 3,879,347 | 4/1975 | Serini et al. | 260/47 |
| 3,879,348 | 4/1975 | Serini et al. | 260/47 |
| 3,892,889 | 7/1975 | Cohnen et al. | 524/91 |
| 3,961,122 | 6/1976 | Gaines | 428/220 |
| 4,278,589 | 7/1981 | Dexter et al. | 524/91 |
| 4,278,590 | 7/1981 | Dexter et al. | 524/91 |

FOREIGN PATENT DOCUMENTS 1141061 2/1983 Canada .
0054856 6/1982 European Pat. Off. .

OTHER PUBLICATIONS

"Tough, Transparent Heat- and Flame-Resistant Thermoplastics via Silicone Block-Modified Bisphenol Fluorenone Polycarbonate", by Kambour et al, vol. 20, 3275-2393 (1976).

Primary Examiner—Melvyn I. Marquis
Attorney, Agent, or Firm—Gene Harsh; Joseph C. Gil; Aron Preis

[57] ABSTRACT

The present invention relates to thin-walled UV-stabilized polycarbonate mouldings, especially webbed laminate panels and films, made of polydiorganosiloxane/-polycarbonate block copolymers.

11 Claims, No Drawings

UV-STABILIZED POLYCARBONATE MOULDINGS

The present invention relates to UV-stabilized polycarbonate mouldings with a thickness of 0.01 mm to 1,2 mm, made of thermoplastic polydiorganosiloxane/polycarbonate block copolymers with a mean weight-average molecular weight ($\overline{M}w$, measured, for example, by ultra-centrifugation or light scattering) of 10,000 to 200,000, preferably of 20,000 to 100,000, consisting of (A) 85% by weight to 99.5% by weight, preferably 90% by weight to 99.5% by weight, based on (A)+(B), of aromatic carbonate structural units (I)

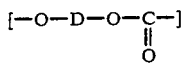

in which
  —O—D—O— is a diphenate radical preferably having 6 to 30 C atoms,
(B) 15% by weight to 0.5% by weight, preferably 10% by weight to 0.5% by weight, based on (A)+(B), of polydiorganosiloxane structural units (II)

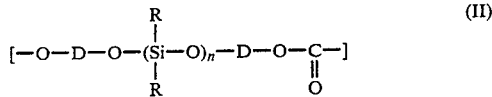

in which
  the symbols R are identical or different and are linear $C_1$–$C_{20}$-alkyl, branched $C_3$–$C_{20}$-alkyl, halogenated linear $C_1$–$C_{20}$-alkyl, halogenated branched $C_3$–$C_{20}$-alkyl or $C_6$–$C_{20}$-aryl, or halogenated $C_6$–$C_{20}$-aryl, but preferably $CH_3$, n is an integer between 5 and 100, preferably between 20 and 80, and D has the meaning of structural unit (I), and
(C) structural units of chain stoppers and, if appropriate, branching agents,
which are characterized in that they contain a UV absorber, preferably in quantities of 0.05% by weight to 1.0% by weight and in particular in quantities of 0.1% by weight to 0.5% by weight, based on the total weight of block copolymer and UV absorber.

According to the invention, preferred polycarbonate mouldings are cavity panels or webbed laminate panels with a flange thickness of 0.3 mm to 1.2 mm and a web height of 0.3 mm and 1.2 mm. With web spacings of between 5 mm and 16 mm and panel thicknesses of between 2 mm and 40 mm, the panel can have any desired length and width. Examples of polycarbonate webbed laminate panels are panels with a width of 2 m and a length of 10 m.

According to the invention, other preferred polycarbonate mouldings are films with a thickness of 0.01 mm to 0.3 mm, preferably 0.05 mm to 0.1 mm.

Polydioranosiloxane/polycarbonate block copolymers are known (cf., for example, U.S. Pat. Nos. 3,189,662, 3,821,325, 3,832,419 and 3,679,774).

They are used as coatings, as insulating materials, as coverings, as binding materials and in adhesives.

U.S. Pat. No. 3,419,634 disclosed polydiorganosiloxane/polycarbonate block copolymers with unsaturated end groups, which can be cured and which can contain fillers; these block copolymers can be used inter alia as coverings, car windows, binders for safety glass and seals for glass.

According to WO No. 80/00084, UV absorbers can be used in mixtures of high-molecular aromatic polycarbonate with up to 50 percent by weight of a block copolymer which consists of alternating segments of aromatic polycarbonate and polysiloxane in a weight ratio of 25:75 to 75:25.

The mixtures are distinguished by a high ductility, solvent resistance and improved fire behaviour. Testpieces and panels with a thickness greater than or equal to 1.6 mm are described.

The polydiorganosiloxane/polycarbonate block copolymer mouldings containing UV absorbers, according to the invention, are prepared by first mixing the polydiorganosiloxane/polycarbonate block copolymers in bulk in a compounding unit or mixing solutions of the block copolymer and UV absorber and then stripping off the solvent in a conventional manner, for example by working up the solution via a stripping extruder. The resulting mixtures of polydiorganosiloxane/polycarbonate block copolymers with UV absorbers are then extruded in a known manner to give the panels according to the invention or the films according to the invention or cast to give the films according to the invention. The casting to give the films according to the invention can also be carried out directly from the mixture of the solutions without prior isolation of the block copolymers containing UV absorbers.

It has now been found, surprisingly, that the content of UV absorber concentrates on the surface of the mouldings according to the invention. This is not the case with other thermoplastics, especially with other thermoplastic polycarbonates; on the contrary, special application processes are required to achieve this. (Cf., for example, U.S. Pat. Nos. 3,043,709, 3,049,443, 3,309,219, 3,309,220, 3,617,330, 3,892,889 and 3,582,398 and German Offenlegungsschrift No. 1,694,273).

In fact, the thin-walled mouldings preferred according to the invention, such as webbed laminate panels and films, particularly need effective UV protection, i.e. UV protection concentrated at the moulding surface.

Compared with the known application processes such as swelling of the surface with a highly concentrated solution of a UV absorber, coating with a special protective lacquer containing UV absorber or coextrusion of a covering layer rich in UV absorber, the incorporation of the UV absorber in the manner according to the invention has the advantage of being the least expensive. It does not require an additional processing step, there is no risk of damage to the thin-walled mouldings due to a solvent effect or after-baking, and there are no calibration problems (such as those encountered with coextrusion). ESCA (=Electron Spectroscopy for Chemical Analyses) can be used to detect the enrichment of the UV absorbers in the surface of the mouldings made of polydiorganosiloxane/polycarbonate block copolymers, according to the invention, the concentration resulting from this enrichment being many times greater than the average volume concentration.

Examples of diphenols HO—D—OH (III) for the carbonate structural units of the formula (I) are hydroquinone, resorcinol, dihydroxybiphenyls, bis(hydroxyphenyl)alkanes, bis(hydroxyphenyl)cycloalkanes, bis(hydroxyphenyl)sulphides, bis(hydroxyphenyl)ethers, bis(hydroxyphenyl)sulphoxides, bis(hydroxyphenyl)sulphones and $\alpha,\alpha$-bis(hydroxyphenyl)diisopropylbenzenes, as well as compounds thereof which are alkylated and halogenated on the nucleus. These and other suitable diphenols are known from the literature (cf., for example, U.S. Pat. No. 3,028,365, German Offenlegungsschrift No. 2,063,050 and German Offenlegungsschrift No. 2,211,957).

Examples of preferred diphenols are 2,2-bis(4-hydroxyphenyl)propane, 1,1-bis(4-hydroxphenyl)cyclohexane, 2,2-bis(3,5-dichloro-4-hydroxyphenyl)propane, 2,2-bis(3,5-dibromo-4-hydroxyphenyl)propane, 2,2-bis(3,5-dimethyl-4-hydroxyphenyl)propane, bis(3,5-dimethyl-4-hydroxyphenyl)methane and bis(4-hydroxyphenyl)sulphide.

The diphenols can be used either by themselves or as mixtures.

Structural units of chain stoppers are monovalent radicals which are derived, for example, from monophenols or, for example, from monobasic carboxylic acids, i.e. monovalent radicals of the formula Iva or Ivb

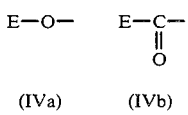

in which

E is an aromatic carbocyclic radical.

The radical E can also be substituted by alkyl or halogen.

Examples of suitable monophenolic chain stoppers are phenol itself as well as p-tert.-butylphenol, p-chlorophenol, 2,4,6-tribromophenol and the various cresols.

Benzoyl chloride, for example, is a suitable carboxylic acid chain stopper.

The content of structural units of chain stoppers is between 0.5 mol % and 10 mol %, based on the total mol of structural units of (I) and (II).

Structural units of branching agents are trivalent or more than trivalent radicals, preferably trivalent or tetravalent radicals, such as those resulting from the incorporation of trifunctional or more than trifunctional branching agents, preferally of trifunctional or tetrafunctional branching agents, in the synthesis of block copolymers. Suitable branching agents with trifunctional or more than trifunctional groups are, in particular, those with three or more than three phenolic OH groups.

Examples of branching agents with three or more than three phenolic hydroxyl groups which can be used are 2,4-bis(4-hydroxyphenylisopropyl)phenol, 2,6-bis(2'-hydroxy-5'-methylbenzyl)-4-methylphenol, 2-(4-hydroxyphenyl)-2-(2,4-dihydroxyphenyl)propane and 1,4-bis(4,4'-dihydroxytriphenylmethyl)benzene.

Branching agents with other functional groups are 2,4-dihydroxybenzoic acid, trimesic acid, cyanuric chloride and 3,3-bis(4-hydroxyphenyl)-2-oxo-2,3-dihydroindole and also 3,3-bis(4-hydroxy-3-methylphenyl)-2-oxo-2,3-dihydroindole.

The content of structural units of branching agents is between 0.05 and 2 mol %, based on the total mol of structural units of (I) and (II).

Polydiorganosiloxanes

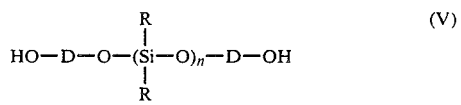

for the polydiorganosiloxane structural units of the formula (II) are known from U.S. Pat. No. 3,419,634 and can be obtained, for example, from the corresponding bis chloro compounds (VI)

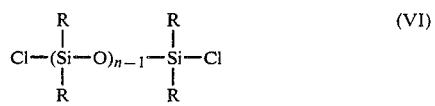

and the diphenols (III), for example according to U.S. Pat. No. 3,419,634, column 3, in combination with U.S. Pat. No. 3,189,662.

In the formulae (V) and (VI), R, D and n have the meaning defined for the formula (II).

In the formulae (II), (V) and (VI), halogenated radicals R are partially or completely chlorinated, brominated or fluorinated radicals.

Apart from the methyl radical already mentioned, examples of suitable radicals R in the formulae (II), (V) and (VI) are ethyl, propyl, n-butyl, tert.-butyl, phenyl, naphthyl, chloromethyl, perfluorobutyl, perfluorooctyl and chlorophenyl.

The polydiorganosiloxane/polycarbonate block copolymers to be used according to the invention can be prepared, for example, under the conditions of the phase boundary method for the preparation of polycarbonates, from the polydiorganosiloxanes (V), the diphenols (III), chain stoppers and, if appropriate, branching agents with phosgene, aqueous alkali and amine catalysts.

The phase boundary method is known for the preparation of aromatic polycarbonates (cf., for example, H. Schnell, Chemistry and Physics of Polycarbonates, Polymer Rev., Volume IX, 1964, page 33 et seq., Interscience Publishers New York, German Offenlegungsschrift No. 1,570,533 and U.S. Pat. Re. No. 27,682) and especially for the preparation of polydiorganosiloxane/polycarbonate block copolymers (cf., for example, U.S. Pat. No. 3,821,325).

The weight ratio of diphenols (III) to polydiorganosiloxanes (V) which is to be used in each case depend on the requisite weight ratio in the block copolymers to be prepared, assuming quantitative reaction of components (III) and (V). The quantity of chain stopper to be used depends on the target molecular weight of the block copolymer and also on whether branching agents are incorporated.

The quantity of chain stopper is thus between 0.5 mol % and 10 mol %, based on mol of components (III)+(V), and the quantity of branching agents, if they are used, is between 0.05 and 2 mol %, based on mol of components (III)+(V).

The quantities of phosgene, amine catalyst, aqueous alkaline phase and organic phase are in the usual range for the preparation of polycarbonates by the phase boundary method.

Examples of suitable amine catalysts are triethylamine or N-ethylpiperidine; sodium hydroxide solution is preferred as the alkaline phase and methylene chloride or chlorobenzene, or a mixture of the two, is used as the organic phase.

Instead of the polydiorganosiloxane/polycarbonate block copolymers containing 15% by weight to 0.5% by weight of polysiloxane structural units (II), to be used according to the invention, it is also possible to use mixtures of polydiorganosiloxane/polycarbonate block copolymers with other thermoplastic aromatic polycarbonates having an $\overline{M}_w$ (sic) of 10,000 to 100,000, based on the diphenols (III), suitable block copolymers for this purpose also being those containing over 15% by weight up to about 60% by weight of polysiloxane structural units (II), provided that the resulting mixture with the other thermoplastic aromatic polycarbonates again contains 15% by weight to 0.5% by weight of polysiloxane structural units (II), as submitted according to the invention.

Suitable UV absorbers which can be used according to the invention are all those which have hitherto proved suitable for the UV stabilization of thermoplastic aromatic polycarbonates, for example those mentioned in U.S. Pat. Nos. 3,309,219, 3,309,220, 3,617,330 and 3,892,889.

Preferred UV absorbers are benzophenones and benzotriazoles.

Examples of suitable UV absorbers are 2-hydroxy-4-methoxybenzophenone, 2-hydroxy-4-methoxy-2'-carboxybenzophenone, 2,4-dihydroxybenzophenone, 2,2'-dihydroxy-4-methoxybenzophenone, 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone, 2-(2'-hydroxy-5'-methylphenyl)-2H-benzotriazole, 2-(2'-hydroxy-5'-tert.-butylphenyl)-2H-benzotriazole, 2-(2'-hydroxy-3'-methyl-5'-tert.-butylphenyl)-2H-benzotriazole, 2-(2'-hydroxy-5'-cyclohexylphenyl)-2H-benzotriazole and 2'-(2'-hydroxy-3',5'-dimethyl-phenyl)-2H-benzotriazole.

The UV absorbers which can be used in particular are 2-(2'-hydroxy-5'-isooctylphenyl)-2H-benzotriazole, 2-(2'-hydroxy-3'-tert.-butyl-5'-sec.-butylphenyl)-2H-benzotriazole and 2-(2'-hydroxy-3',5'-dimethyl-phenyl)-2H-benzotriazole.

Together with the UV absorbers to be added according to the invention, it is also possible to add to the polydiorganosiloxane/polycarbonate block copolymers the additives conventionally used for thermoplastic polycarbonates, such as reinforcing materials, lubricants, antistatic agents, flame retardants or pigments.

In terms of the present invention, webbed laminate panels are all types of cavity panels, for example also cavity panels according to European Offenlegungsschrift No. 0,054,856. The cavity panels or webbed laminate panels should have a flange thickness or web hight of 0.3 mm to 1.2 mm. These panels are produced in a known manner from the block copolymers containing UV absorbers which are to be used according to the invention.

In terms of the present invention, polycarbonate films are all types of films, especially extruded and cast films. These can be produced as such or alternatively produced immediately as coatings for other thermoplastics, for example via coextrusion in situ, and applied to the other thermoplastics. Thermoplastic bisphenol-A homopolycarbonates, for example, can be used as other thermoplastics.

The polycarbonate mouldings according to the invention have external technical applications, for instance as thermally insulating glazing, for example for greenhouses, industrial constructions, sports halls and swimming baths, as roofing for spectator stands or panelling for passenger shelters, or as weather-resistant protective sheeting.

For practical testing of the polycarbonate mouldings according to the invention, a modified falling-ball test developed on webbed laminate panels (for example according to European Offenlegungsschrift No. 0,054,856) on the basis of DIN 53443 was carried out, in which a penetrating body of 5 mm diameter is to cause similar biaxial stresses to intended those of a falling hailstone. At room temperature, a weight of 36 kg falling from a height of 0.2 m strikes the test-pieces, which are lying free in a support ring of 20 mm internal diameter. The impact of the falling bolt takes place exactly centrally between the webs of the panel. By this method, the side exposed to the weather, which in practice is the outside (=the uppermost flange of the webbed laminate panel), is tested in the pressure zone.

The fracturing is characterized by numbers (1=brittle fracture, 2=clean break, 3=ductile-brittle fracture, 4=ductile fracture).

As a measure of the toughness, the damaging energy $W_S$ is calculated from the falling energy and the buckling depth.

The invention is illustrated by the examples which follow. For comparison purposes, panels of the same dimensions, i.e. with the same panel, web and flange thickness for the same web spacing, were extruded in every case.

The siloxane content, i.e. the proportion of dimethylsiloxy units in % by weight, based on the total weight of the block copolymer, was determined gravimetrically and by nuclear magnetic resonance spectrometry. The degree of polymerization $\overline{P}_n$ measured by determining the end groups on siloxane prepolymer is given as the average length of the siloxane blocks.

EXAMPLE 1

The following polymers were extruded to give webbed double panels (length 2 m, width 20 cm) of a thickness of 10 mm, with a flange height of 0.8 mm, a web height of 0.5 mm and a web spacing of 10 mm:

1. A polycarbonate based on bisphenol-A, branched with 0.3 mol % of isatinbiscresol, which had a relative solution viscosity of 1.32, measured in methylene chloride at 25° C. and at a concentration of 0.5% by weight, and additionally contained 0.3% by weight of 2-(2'-hydroxy-3'-tert.-butyl-5'-sec.-butylphenyl)-2H-benzotriazole.

2. A copolycarbonate based on bisphenol-A and 5.5% by weight of polydimethylsiloxane of block length 40, which had a relative solution viscosity of 1.29.

3. The copolycarbonate 2., which additionally contained 0.3% by weight of 2-(2'-hydroxy-3'-tert.-butyl-5'-sec.-butylphenyl)-2H-benzotriazole.

Panel sections were weathered in a Weather o-meter with artificial rain and sunlight simulated by a xenon lamp.

| Panel | 0* | 1. | 2. | 3. |
|---|---|---|---|---|
| 0 h (initial state) | | | | |
| Damaging energy (J) | 3.01 | 2.95 | | 2.96 |
| Fracturing | 4 | 4 | | 4 |
| 1000 h | | | | |
| Damaging energy (J) | 0.10 | 0.96 | | 2.28 |
| Fracturing | 1 | 2 × 4/4 × 3 | | 4 |
| 2000 h | | | | |
| Damaging energy (J) | 0.14 | 1.09 | | 1.80 |
| Fracturing | 1 | 4 × 4/2 × 3 | | 4 |
| 3000 h | | | | |
| Damaging energy (J) | 0.11 | 0.88 | | 1.77 |
| Fracturing | 1 | 1 × 4/6 × 3 | | 5 × 4/1 × 3 |

*Zero test corresponds to polycarbonate 1 not containing UV absorber. The values will be reported later.

We claim:

1. A UV-stabilised polycarbonate moulding with a thickness of 0.01 mm to 1.2 mm, made of a thermoplastic polydiorganosiloxane/polycarbonate block copolymer with a mean weight-average molecular weight ($\overline{M}w$) of 10,000 to 200,000, consisting of
   (A) 85% by weight to 99.5% by weight, based on (A)+(B), of aromatic carbonate structural units of the general formula

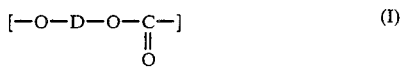

in which
   —O—D—O— is a diphenate radical,
   (B) 15% by weight to 0.5% by weight, based on (A)+(B), of polydiorganisiloxane structural units of the general formula

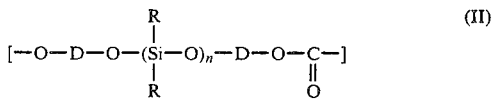

in which
   radicals R are identical or different and denote a linear $C_1$-$C_{20}$-alkyl, branched $C_3$-$C_{20}$-alkyl, halogenated linear $C_1$-$C_{20}$-alkyl, halogenated branched $C_3$-$C_{20}$-alkyl, $C_6$-$C_{20}$-aryl or halogenated $C_6$-$C_{20}$-aryl radical,
   n is an integer between 5 and 100 and
   —O—D—O— has the foregoing meaning for its part of the structural unit of formula (I), and
   (C) structural units of chain stoppers and, if desired, branching agents,
   in which the block copolymer contains a UV absorber said UV absorber being concentrated on its surface.

2. A polycarbonate moulding according to claim 1, containing the UV absorber in an amount of 0.05% by weight to 1.0% by weight, based on the total weight of block copolymer and UV absorber.

3. A polycarbonate moulding according to claim 2, containing the UV absorber in an amount of 0.1% to 0.5% by weight, based on the total weight of block copolymer and UV absorber.

4. A polycarbonate moulding according to claim 1, in which the UV absorber is selected from 2-(2'-hydroxy-5'-isooctylphenyl)-2H-benzotriazole, 2-(2'-hydroxy-3'-tert.-butyl-5'-sec.-butylphenyl)-2H-benzotriazole and 2-(2'-hydroxy-3',5'-dimethylphenyl)-2H-benzotriazole.

5. A polycarbonate moulding according to claim 1, in which the block copolymer has a mean weight-average molecular weight ($\overline{M}w$) of 20,000 to 100,000.

6. A polycarbonate moulding according to claim 1, which consists of (A) 90% to 99.5% by weight, based on (A)+(B) of structural units of formula (I) and (B) 10% to 0.5% by weight, based on (A)+(B) of structural units of formula (II).

7. A polycarbonate moulding according to claim 1, in which the diphenate radical —O—D—O— has 6 to 30 carbon atoms.

8. A polycarbonate moulding composition according to claim 1 in which radicals R represent methyl groups.

9. A polycarbonate moulding according to claim 1, in the form of a cavity panel or webbed laminate panel with a flange thickness or web height of 0.3 mm to 1.2 mm.

10. A polycarbonate moulding according to claim 1 in the form of a film with a thickness of 0.01 to 0.3 mm.

11. A polycarbonate moulding according to claim 10 in the form of a film with a thickness of 0.05 to 0.1 mm.

* * * * *